(12) United States Patent
Gerstenberger et al.

(10) Patent No.: US 7,471,705 B2
(45) Date of Patent: Dec. 30, 2008

(54) ULTRAVIOLET LASER SYSTEM AND METHOD HAVING WAVELENGTH IN THE 200-NM RANGE

(75) Inventors: David C. Gerstenberger, Bothell, WA (US); Mark S. Bowers, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 12 days.

(21) Appl. No.: 11/558,362

(22) Filed: Nov. 9, 2006

(65) Prior Publication Data

US 2007/0211773 A1    Sep. 13, 2007

Related U.S. Application Data

(60) Provisional application No. 60/735,615, filed on Nov. 9, 2005.

(51) Int. Cl.
    *H01S 3/10* (2006.01)
(52) U.S. Cl. .......................... 372/21; 372/22
(58) Field of Classification Search .......... 372/21, 372/22
    See application file for complete search history.

(56) References Cited

U.S. PATENT DOCUMENTS

| | | |
|---|---|---|
| 3,934,154 A | 1/1976 | Cook, Jr. |
| 5,144,630 A | 9/1992 | Lin |
| 5,216,681 A | 6/1993 | St. Pierre et al. |
| 5,260,953 A | 11/1993 | Rowe |
| 5,281,211 A | 1/1994 | Parel et al. |
| 5,312,320 A | 5/1994 | L'Esperance, Jr. |
| 5,343,485 A | 8/1994 | Okazaki |
| 5,363,388 A | 11/1994 | Shi et al. |
| 5,408,481 A | 4/1995 | Scheps |
| 5,423,801 A | 6/1995 | Marshall et al. |
| 5,430,754 A | 7/1995 | Suzuki et al. |
| 5,457,707 A | 10/1995 | Sobey et al. |
| 5,477,378 A | 12/1995 | Johnson |
| 5,579,152 A | 11/1996 | Ellington et al. |
| 5,633,883 A | 5/1997 | Shi et al. |
| 5,638,388 A | 6/1997 | Nighan, Jr. et al. |
| 5,742,626 A * | 4/1998 | Mead et al. .................. 372/22 |

(Continued)

OTHER PUBLICATIONS

Asakawa, Yuichi, et al., "High-power CW DUV coherent light source around 200 nm", 2004, Publisher: Optical Society of America.

(Continued)

*Primary Examiner*—Dung T. Nguyen
(74) *Attorney, Agent, or Firm*—Charles A. Lemaire; Lemaire Patent Law Firm, P.L.L.C.

(57) ABSTRACT

An apparatus and method applicable for generating ultraviolet laser light having a wavelength in the 200-nm range and/or 250-nm range; in some embodiments, using a single fiber laser pump source (in some embodiments, a pulsed source). In some embodiments, the invention provides methods of generating 250-nm or 200-nm photons using a mode-locked 1000-nm fiber laser and efficient 4th/5th harmonic frequency up-conversion. In other embodiments, the invention uses continuous wave (cw) single-frequency fiber lasers and external resonant frequency conversion. In still other embodiments, the invention uses cw single-frequency optically-pumped semiconductor lasers (OPSLs) and electrically driven vertical-cavity surface-emitting lasers (VCSELs) and externally resonant frequency conversion. All of these produce both of the ultraviolet wavelengths of interest

32 Claims, 4 Drawing Sheets

U.S. PATENT DOCUMENTS

| | | | |
|---|---|---|---|
| 6,002,697 | A | 12/1999 | Govorkov et al. |
| 6,590,698 | B1 | 7/2003 | Ohtsuki et al. |
| 6,680,956 | B2 | 1/2004 | Gerstenberger et al. |
| 6,735,234 | B1 | 5/2004 | Paschotta et al. |
| 6,741,620 | B2 | 5/2004 | Gerstenberger et al. |
| 6,901,090 | B1 | 5/2005 | Ohtsuki |
| 6,940,885 | B1 | 9/2005 | Cheng et al. |
| 2002/0054613 | A1 | 5/2002 | Kang |
| 2002/0095142 | A1* | 7/2002 | Ming ............... 606/5 |
| 2002/0191171 | A1 | 12/2002 | Nishi |
| 2005/0169326 | A1 | 8/2005 | Jacob et al. |

OTHER PUBLICATIONS

Brown, Daniel J.W., et al., "High-avg-power (15-W) 255-nm source based on 2nd-harmonic gen. of a Cu laser master osc. power amplifier system in CLBO", "Optics Letters", Dec. 1, 2001, pp. 1185-1887, vol. 26, No. 23.

Chang, L. B., et al., "Efficient compact watt-level deep-UV laser generated from a multi-kHz Q-switched diode-pumped solid-state laser system", "Optics Communications", Aug. 15, 2002, pp. 397-401, vol. 209.

Coherent, Inc., "Cesium Lithium Borate", "www.coherent.com/downloads/CLBO_DS.pdf", 2002.

Knittel, Joachim, et al., "Fourth Harmonic Generation in a Resonant Ring Cavity", "IEEE Journal of Quantum Electronics", Nov. 1997, pp. 2021-2028, vol. 33, No. 11.

Kojima, Tetsuo, et al., "20-W ultraviolet-beam generation by fourth-harmonic generation of an all-solid-state laser", "Optics Letters", Jan. 1, 2000, pp. 58-60, vol. 25, No. 1.

Kuznetsov, Mark, et al., "Design and Characteristics of High-Power (0.5-W CW) Diode-Pumped VECSEL's with Circular TEM00 Beams", "IEEE Journal of Selected Topics in Quantum Elec.", May 1999, pp. 561-573, vol. 5, No. 3.

Oka, Michio, et al., "All Solid-state Continuous-Wave Frequency-Quadrupled Nd : YAG Laser", "IEEE Journal of Selected Topics in Quantum Elec.", Sep. 1995, pp. 859-866, vol. 1, No. 3.

Okhotnikov, O. G., et al., "Mode-locked ytterbium fiber laser tunable in the 980- 1070-nm spectral range", "Optics Letters,", Sep. 1, 2003, pp. 1522-1524, vol. 28, No. 17.

Gerstenberger, David C. et al., "Noncritically phase-matched second harmonic generation in cesium lithium borate", "Optics Letters", Jul. 15, 2003, pp. 1242-1244, vol. 28, No. 14.

Wall, Kevin F. et al., "A quasi-continuous-wave deep ultraviolet laser source", "IEEE Journal of Quantum Electronics", Sep. 2003, pp. 1160-1169, vol. 39, No. 9.

Borsutzky et al., "Harmonic and Sum-Frequency Generation of Pulsed Laser Radiation in BBO, LBO and KD*P", "Appl. Phys.", 1991, pp. 55-62, vol. 52.

Borsutzky et al., "Tunable UV Radiation at Short Wavelengths (188-240 nm) Generated by Sum-Frequency Mixing in Lithium Borate", "Appl. Phys.", 1991, pp. 380-384, vol. 52.

Lublinski et al., "Collinear and Non-Collinear Sum Frequency Mixing in .beta.-BBO for a Tunable 195-198 nm all-solid-state Laser System", "Appl. Phys.", 1995, pp. 529-532, vol. 61.

* cited by examiner

ULTRAVIOLET LASER SYSTEM AND METHOD HAVING WAVELENGTH IN THE 200-NM RANGE

CROSS-REFERENCE TO RELATED APPLICATIONS

This invention claims benefit of U.S. Provisional Patent Application 60/735,615 filed Nov. 9, 2005, which is hereby incorporated by reference in its entirety.

FIELD OF THE INVENTION

The invention relates generally to lasers and nonlinear optical frequency conversion and more particularly to methods and apparatus applicable for generating ultraviolet laser light having a wavelength in the 200-nm range and/or 250-nm range that use, in some embodiments, a single pulsed or cw (continuous wave) fiber-laser pump source, and non-critically phase matched CLBO (cesium lithium borate).

BACKGROUND OF THE INVENTION

A number of commercial applications require compact, efficient, and reliable laser systems in the ultraviolet wavelength range near and below 250 nm and also near and below 200 nm.

One of these applications is inspection for the semiconductor manufacturing industry. This includes inspection of wafers during processing, masks that are used for photolithography, and reticles. Currently, advanced semiconductor processing is using laser sources at 248 nm (KrF excimer lasers) and 193 nm (ArF excimer lasers) for photolithography. Laser sources near these wavelengths are needed for inspection applications.

Currently, there are no adequate laser sources for semiconductor inspection at these wavelengths. Excimer lasers that are used for photolithography have the proper wavelengths, but operate in pulsed mode with low repetition rates (less than about 1 kHz). These lasers are not suitable for scanning applications such as inspection. Frequency-doubled ion lasers (FreDs) can provide continuous wave (cw) outputs at various wavelengths near and below 250 nm (for example, 257 nm and 244 nm), but these systems are very large, inefficient, costly, and relatively unreliable. Diode-pumped frequency-quadrupled Nd:YAG lasers can provide cw output at 266 nm, which is rather far away from the desired wavelengths near 250 nm and 200 nm. Laser systems employing photons from 244-nm FreD lasers combined with photons from 1064-nm solid-state lasers provide output photons at 198 nm (1/244+ 1/1064=1/198), but these systems are very complex, inefficient, costly, and relatively unreliable. That approach also requires two separate lasers, which is undesirable for cost and complexity considerations. Further, for pulsed operation, it is costly and difficult to adequately synchronize pulses from different pulsed laser sources.

U.S. Pat. No. 5,638,388, issued Jun. 10, 1997 to Nighan et al., titled "Diode pumped, multi axial mode intracavity doubled laser," is incorporated herein by reference. Nighan et al. describe an intracavity frequency doubling using $Nd:YVO_4$ for lasing and temperature-controlled KTP for frequency doubling to obtain 532-nm wavelength light having a large number of axial modes such that the total continuous wave (cw) output power remains relatively constant.

U.S. Pat. No. 6,002,697, issued Dec. 14, 1999 to Govorkov et al., titled "Diode pumped laser with frequency conversion into UV and DUV range," is incorporated herein by reference. Govorkov et al. used separate temperature-controlled enclosures for their non-linear crystals, and frequency quadrupled and quintupled 1064 nm wavelength light to obtain 266 nm wavelength light and 213 nm wavelength light, respectively, but these are longer wavelengths than desired for certain applications.

A paper by D. C. Gerstenberger et al., "Non-critically phase-matched second harmonic generation in cesium lithium borate," Opt. Lett., 28, 1242 (Jul. 15, 2003), which is incorporated by reference, described efficient generation of 236-nm light (e.g., the fourth harmonic of a 946-nm Nd:YAG laser, in some embodiments) by use of noncritically phase-matched second-harmonic generation in cesium lithium borate. In some embodiments, noncritical phase matching provided approximately twenty times the nonlinear drive for second-harmonic generation than β-barium borate for 236-nm generation. In some embodiments, phase matching was accomplished at a crystal temperature of −15 degrees C.

Generation of ultraviolet light by use of diode-pumped 1-micron solid-state lasers and harmonic generation with nonlinear optical crystals has resulted in a variety of commercial laser products and industrial applications. The primary nonlinear optical crystals for generation of ultraviolet light are from the borate class. (See, e.g., T. Kojima, S. Konno, S. Fujikawa, K. Yasui, K. Yoshizawa, Y. Mori, T. Sasaki, M. Tanaka, and Y. Okada, Opt. Lett. 25, 58 (2000); D. J. W. Brown and M. J. Withford, Opt. Lett. 26, 1885 (2001); M. Oka, L. Liu, W. Weichmann, N. Eguchi, and S. Kubota, IEEE J. Sel. Top. Quantum Electron. 1, 859 (1995); and J. Knittel and A. H. Kung, IEEE J. Quantum Electron. 33, 2021 (1997), each incorporated herein by reference.) Borate-class nonlinear optical crystals include lithium triborate, β-barium borate (BBO), and cesium lithium borate (CLBO). Recently, average powers near 20 W at 266 nm (Kojima et al., supra) and near 15 W at 255 nm (Brown et al, supra) were obtained with CLBO. Conversion efficiencies for these systems approached 30%.

In general, the nonlinear drive for the borate crystals for fourth- and fifth-harmonic generation by use of 1-micron neodymium lasers is relatively low. This is so primarily because of the relatively small value of the nonlinear coefficient compared with those of crystals (such as KTP, lithium niobate, and periodically poled materials) for generation of visible light, and also because of Poynting vector walk-off. Thus, efficient nonlinear conversion that uses borates requires high-peak-power lasers or power enhancement in external resonators (for example, Oka et al., supra reported 52% efficient continuous-wave generation of 266-nm UV light when they used BBO in an external resonator, and Knittel and Kung, supra, used an external resonator and a diode-pumped Q-switched Nd:YAG laser system to generate 266-nm light with 30% efficiency). Chang et al. (L. B. Chang, S. C. Wang, and A. H. Kung, Opt. Commun. 209, 397 (2002)) utilized a similar scheme to generate the 213-nm fifth harmonic at 7.5% efficiency.

What is needed is an efficient fourth and/or fifth harmonic frequency up-conversion from approximately 1000 nm pump light.

BRIEF SUMMARY OF THE INVENTION

In some embodiments, the invention provides methods of generating 250 nm or 200 nm wavelength photons using a mode-locked 1000 nm wavelength fiber laser and efficient 4th/5th harmonic frequency up-conversion. In some embodiments, a single pulsed source laser operating at 1000 nm is used. In other embodiments, the invention uses continuous wave (cw) single-frequency fiber lasers and external resonant frequency conversion. In still other embodiments, the invention uses cw single-frequency optically-pumped semiconductor lasers (OPSLs) and electrically driven vertical-cavity surface-emitting lasers (VCSELs) and externally resonant frequency conversion. All of these produce both of the ultraviolet wavelengths of interest.

Of particular interest, in some embodiments, non-critically phase matched CLBO (cesium lithium borate) is used as the sum-frequency generation device, in order that high-efficiency conversion is obtained using a single source laser operating at about a 1000-nm wavelength. In some embodiments, the curve of highest-efficiency conversion for non-critically phase matched CLBO sum-frequency generation intersects input wavelengths at or almost exactly at 1000 nm input wavelength and 250 nm input wavelength (which is obtainable by frequency quadrupling the 1000 nm input wavelength), in order to obtain a 200-nm output wavelength. This provides inexpensive and highly efficient generation of 200 nm wavelength output light.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Scientists at Aculight Corporation obtained efficient ultraviolet-light generation in the spectral range near 236 nm using diode-pumped solid-state lasers and non-critically phase-matched (NCPM) second-harmonic generation in cesium lithium borate (CLBO). (See D. C. Gerstenberger et al., "Non-critically phase-matched second harmonic generation in cesium lithium borate," *Opt. Lett.*, 28, 1242 (Jul. 15, 2003) (described supra); and U.S. Pat. No. 6,741,620, issued May 25, 2004, to D. C. Gerstenberger and M. S. Bowers, titled "Methods and devices for efficient generation of ultraviolet light," which are both incorporated herein by reference.) Typically, ultraviolet (uv) generation using frequency-doubling is relatively inefficient due to the relatively small nonlinear drive in crystals such as beta barium borate (BBO), and also due to Poynting vector walkoff, which limits focusing into these crystals. The approach of the present invention avoids these limitations by using a laser source in the 946 nm spectral range, frequency-doubling to the 473 nm blue spectral range using conventional materials such as periodically-poled potassium titanyl phosphate (PPKTP) and magnesium-oxide-doped periodically-poled lithium niobate (MOPPLN) and non-critical phase-matching (NCPM) in CLBO. The non-linear drive for generation of 236 nm light (i.e., the conversion coefficient $\Gamma$) using this approach (i.e., NCPM in CLBO) is approximately twenty times larger than it is using BBO (e.g., see FIG. 1, where the conversion coefficient $\Gamma$ at 236 nm is 0.002 for CLBO versus 0.0001 for BBO, a factor of twenty times).

Figure 1:
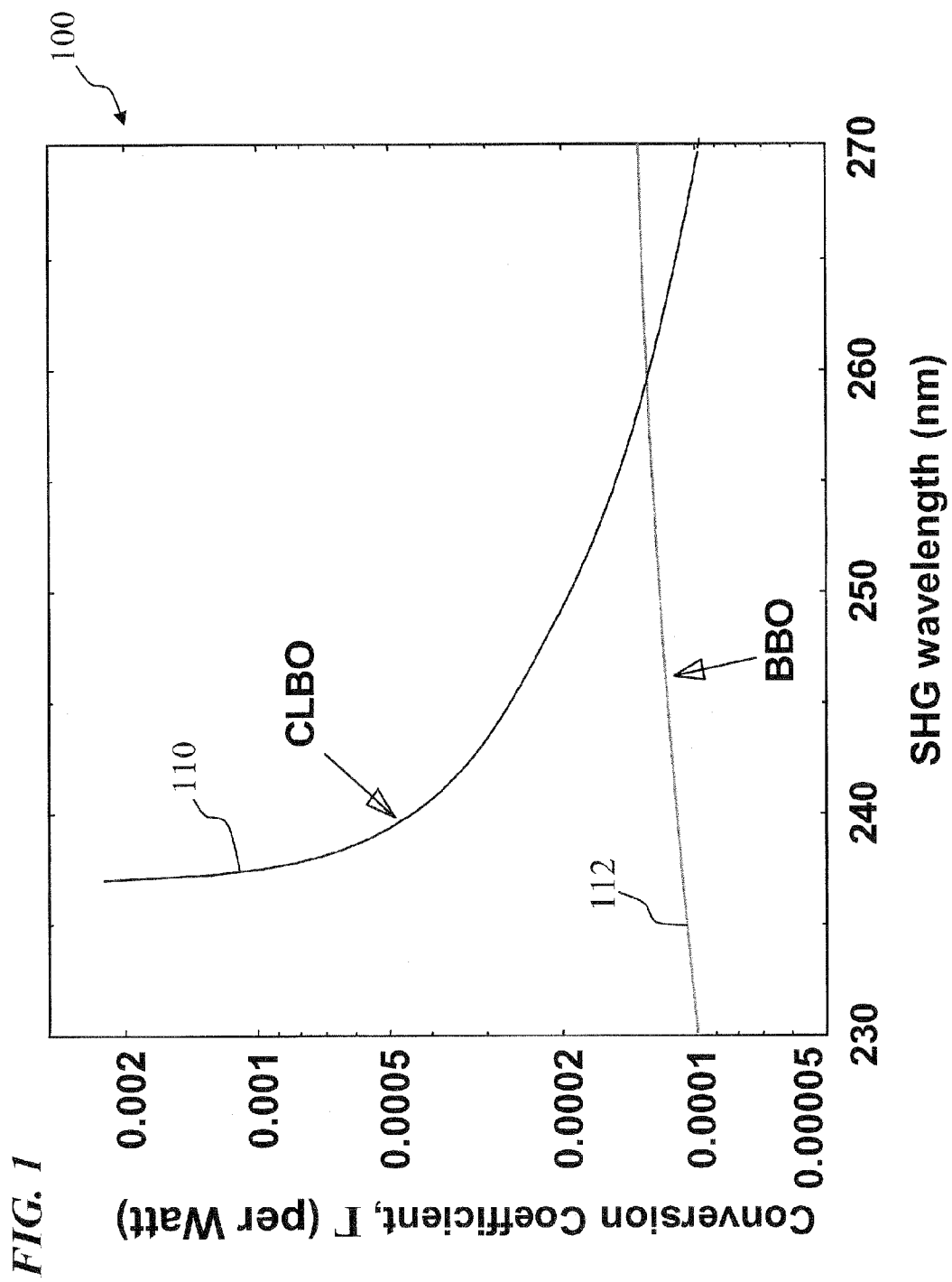
FIG. 1 is a graph 100 of conversion coefficients for frequency-doubling in CLBO (cesium lithium borate) and BBO (beta barium borate).

FIG. 1 is a graph 100 of conversion coefficients for frequency-doubling in CLBO (cesium lithium borate) and BBO (beta barium borate). The conversion coefficient for CLBO 110 and the conversion coefficient BBO 112 are shown over the second-harmonic generation (SHG) wavelength.

Figure 2:
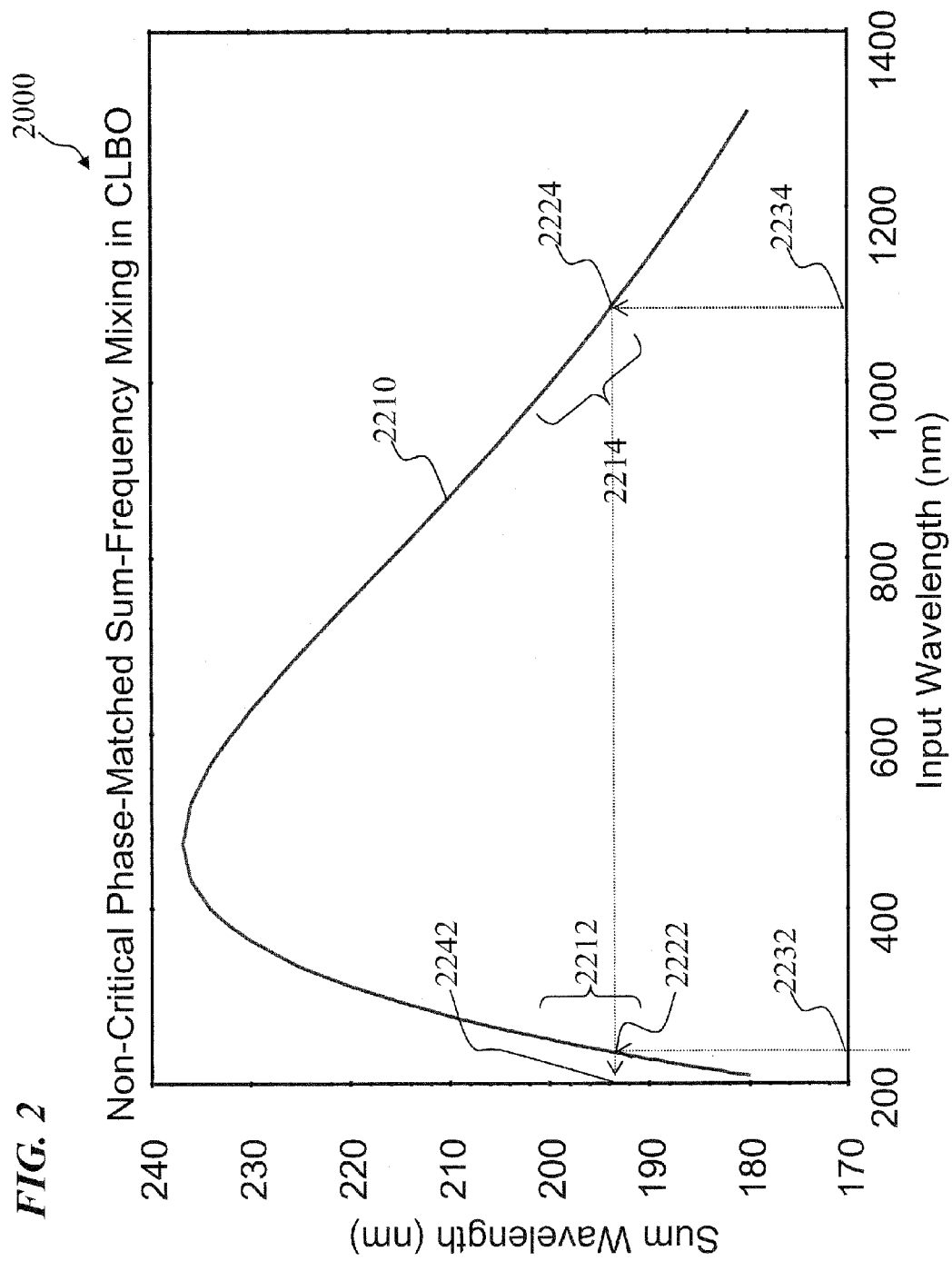
FIG. 2 is a graph 2000 of non-critical phase-matched sum frequency mixing in CLBO.

FIG. 2 is a graph 2000 of non-critical phase-matched sum frequency mixing in CLBO. In some embodiments, the present invention uses non-critical phase-matched sum-frequency mixing CLBO crystals such as specified in the above described paper (D. C. Gerstenberger et al., "Non-critically phase-matched second harmonic generation in cesium lithium borate," *Opt. Lett.*, 28, 1242 (Jul. 15, 2003)), for example, a crystal with theta=90 degrees and phi=45 degrees, such as are available from Coherent Crystal Associates, 31 Farinella Drive, East Hanover, N.J. 07936 (a division of Coherent, Inc.) Sum-frequency mixing (SFM) using NCPM in CLBO is a way to efficiently generate shorter wavelengths. For example, as shown in FIG. 2, SFM using 236-nm input wavelength 2232 on the left-hand upslope 2212 (which intersects curve 2212 at point 2222) and an additional laser source 2234 of near 1090 nm wavelength on the right-hand downslope 2214 (which intersects curve 2214 at point 2224) as input sources can efficiently produce 194 nm light output 2242, as a horizontal line intersecting curve 2210 and the sum wavelength axis intersection. Sum-frequency mixing obtains an output wavelength that conserves energy, and can be calculated using the formula $$wavelength_{OUT} = \left( \frac{wavelength_{IN.1} \times wavelength_{IN.2}}{wavelength_{IN.1} + wavelength_{IN.2}} \right)$$

or $wavelength_{OUT}=(wavelength_{IN.1} \times wavelength_{IN.2})/(wavelength_{IN.1}+wavelength_{IN.2})$, wherein the curve shown in FIG. 2 and (the same curve is shown in greater detail in FIG. 3) is only one of many curves that satisfy this formula. However, in some embodiments, this particular curve is a unique curve at which highest efficiency conversion occurs when using NCPM CLBO, so it is unique in its high-efficiency conversion. If this curve is chosen, only one frequency also satisfies the formula $wavelength_{IN.1}=4 \times wavelength_{IN.2}$, and this frequency is $wavelength_{OUT}=200$ nm=(1000 nm×250 nm)/(1000 nm+250 nm), wherein $wavelength_{IN.1}=1000$ nm and $wavelength_{IN.2}=250$ nm. Less advantageously, however, starting with 1090 nm laser light, frequency quadrupling gives 272.5 nm (which does not correspond to (is not on the same horizontal line as) 1090 nm on the curve of FIG. 2, and thus will not be as highly efficient in sum-frequency generation), thus a separate 944-nm-wavelength second laser must be frequency quadrupled to obtain the 236-nm light for wavelength$_{IN\text{-}2}$ (e.g., the 944-nm wavelength is frequency-doubled, which is then sum-frequency mixed with 1090-nm-wavelength light (wavelength$_{IN\text{-}1}$) from a first laser to obtain the output 194-nm light. This wavelength is nearly ideal for inspection applications near the 193 nm ArF excimer laser wavelength.

Figure 3:
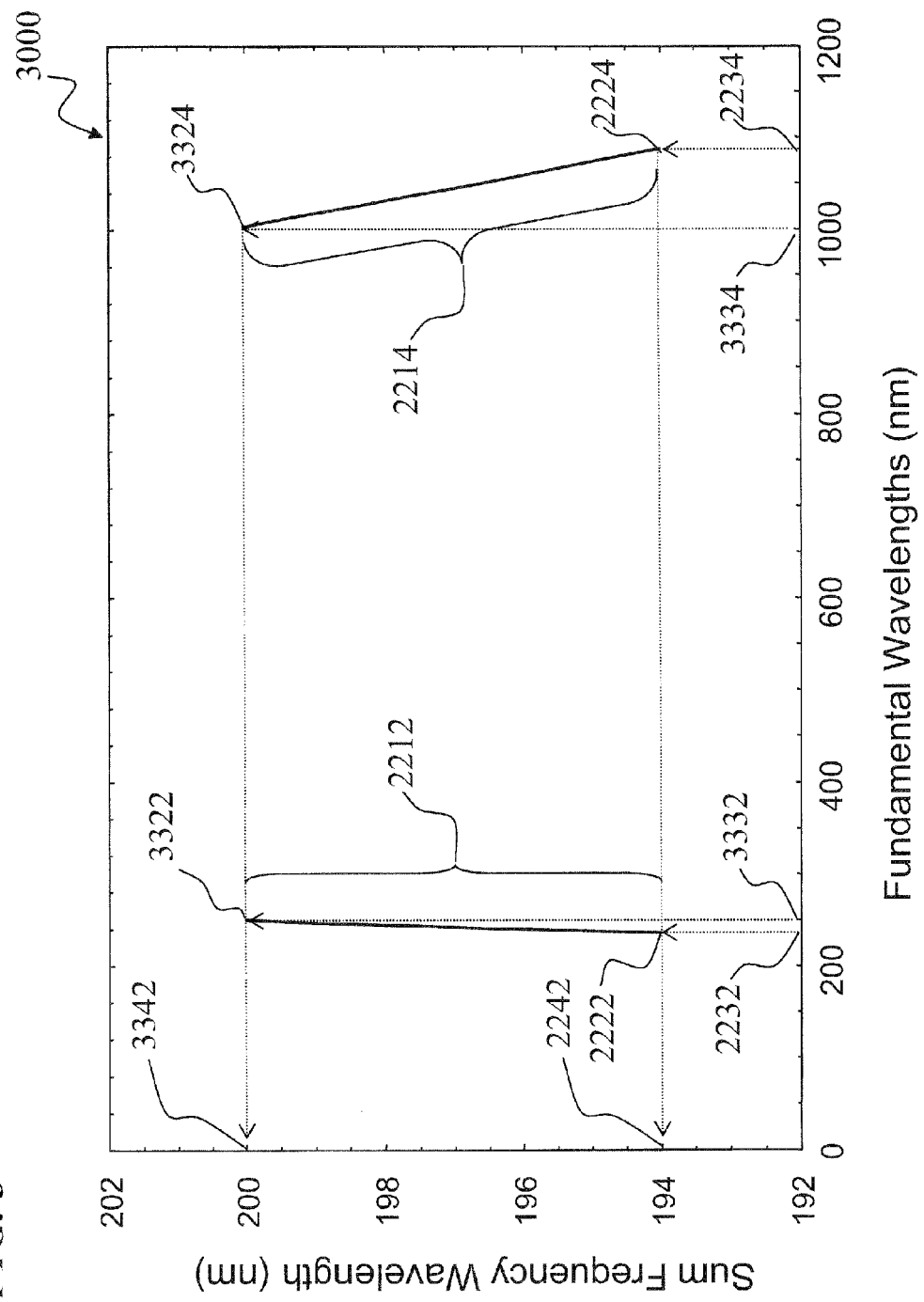
FIG. 3 is a close-up graph 3000 of sum frequency mixing near 200 nm.

FIG. 3 is a close-up graph 3000 of sum-frequency mixing near 200 nm. As described previously, the use of two separate laser systems to generate light near 200 nm is less desirable. One advantage of using a single laser is that a single pulsed laser's output pulse is more easily synchronized with a frequency quadrupled version of itself than trying to synchronize pulses from separate lasers. FIG. 3 shows a portion of the curve 2210 in FIG. 2 with output light 3342 near the sum-frequency wavelength of 200 nm and output light 2242 near the sum-frequency wavelength of 194 nm. In FIG. 3, sum wavelengths of about 194 nm and 200 nm are generated by frequency mixing 236-nm light 2232 (which intersects curve 2212 at point 2222) and 1090-nm light 2234 (which intersects curve 2214 at point 2224) to produce 194 nm light and mixing 250 nm light 3332 (which intersects curve 2212 at point 3322) with 1000 nm light 3334 (which intersects curve 2214 at point 3324) to produce 200 nm light. In some embodiments, starting with light from a pulsed laser having a wavelength of about 1000 nm allows frequency quadrupling to obtain 250-nm light, which is then sum-frequency mixed with a delayed version of the source 1000-nm-wavelength pulse to obtain a 200-nm-wavelength output pulse. This allows use of a single laser for frequency quadrupling and sum-frequency mixing while staying on the CLBO high-efficiency curve of FIG. 2 and FIG. 3.

Since 250 nm light can be generated by frequency-doubling 1000 nm light to generate 500-nm green light, and then frequency-doubling the 500 nm light to produce 250-nm ultraviolet light, nonlinear frequency conversion using a single 1000 nm laser can provide output at both 250 nm and 200 nm with high efficiency.

Frequency-doubling to convert 1000 nm infrared light to 500 nm green light can be relatively efficiently performed using a variety of nonlinear crystals such as KTP, lithium niobate, LBO, and periodically-poled materials such as PPLN, PPKTP, and MOPPLN, as is well-known to those skilled in the art. Frequency-doubling of 500 nm light to produce 250-nm ultraviolet light can be done using CLBO as shown in FIG. 1. CLBO is approximately twice as efficient for generation of 250 nm light than is BBO.

There are several options for source lasers with output wavelengths at 1000 nm. Recently, tunable output from an ytterbium (Yb) fiber laser was demonstrated over the spectral range from 980 nm to 1070 nm. (See O. G. Okhotnikov et al., "Mode-locked ytterbium fiber laser tunable in the 980- to 1070-nm spectral range", *Opt. Lett.*, 28, 1522 (Sep. 1, 2003), which is incorporated herein by reference.) In some embodiments, such a laser is tuned to 1000 nm to provide wavelength$_{IN\text{-}1}$. An optically-pumped semiconductor laser (OPSL) with output at 1004 nm was recently reported. (See M. Kuznetsov et al, "Design and characteristics of high-power (>0.5-W cw) diode-pumped vertical-external-cavity surface-emitting semiconductor laser with circular TEM$_{00}$ Beams", *IEEE. Sel. Topics Quantum Electron.*, 5(3), 561, May/June, 1999, which is incorporated herein by reference.) In some embodiments, such a laser is used to provide wavelength$_{IN\text{-}1}$. Electrically-pumped VCSELs at 1000 nm are used, in some embodiments, by proper engineering of the semiconductor material. (See, for example, U.S. Pat. No. 6,940,885, entitled "Systems, methods, and apparatuses for optically pumped vertical cavity surface emitting laser devices" issued Sep. 6, 2005, to Cheng, et al., and which is incorporated herein by reference.) In some embodiments, an optically-pumped VCSEL structure of Cheng et al. is adapted to include a resonant cavity with multiple fixed wavelengths, or a resonance cavity whose wavelength is continuously tunable, to include an output laser wavelength of about 1000 nm.

Figure 4:
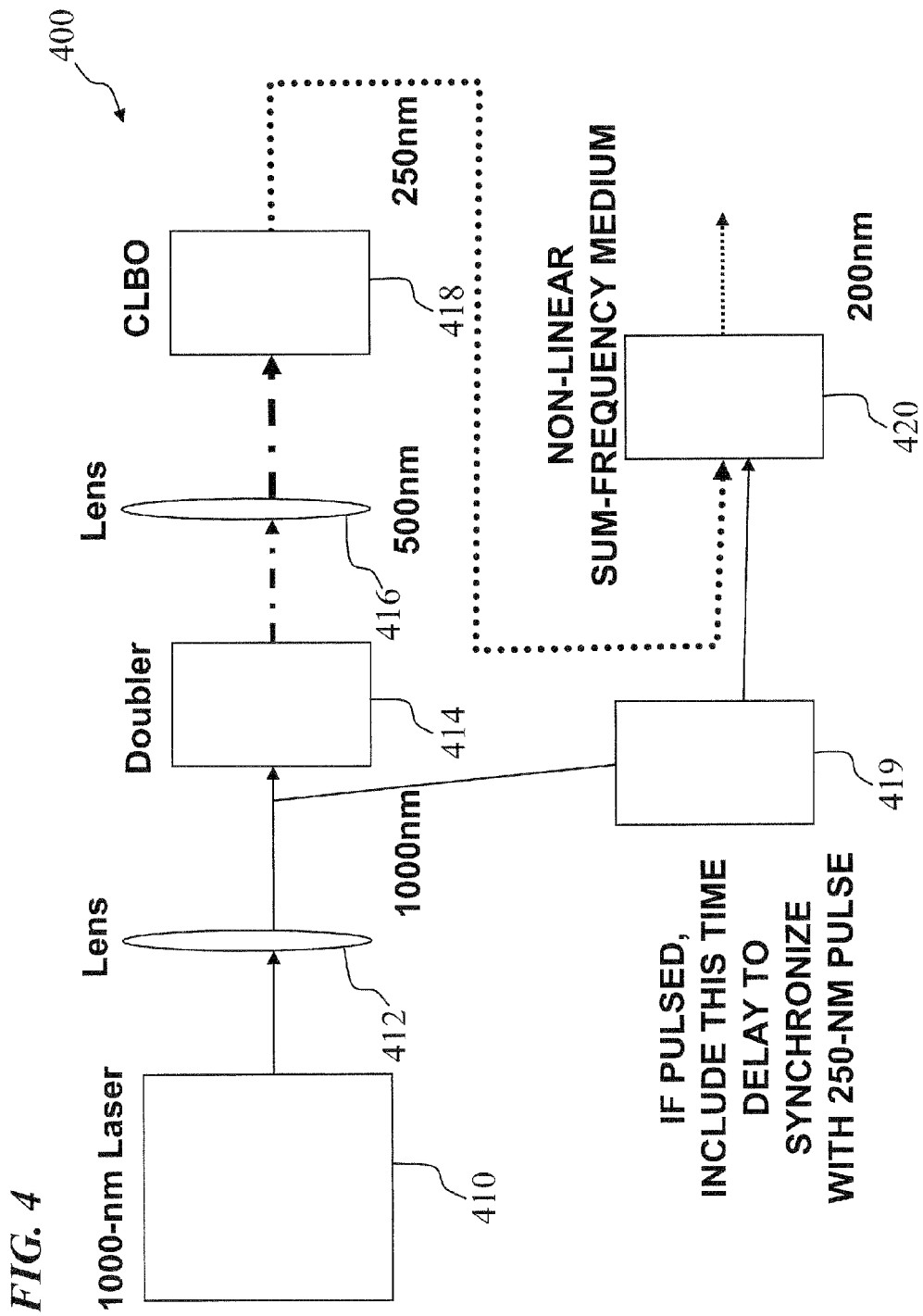
FIG. 4 is a schematic box diagram 400 of an optical layout for the cw or pulsed single-frequency approach.

In some embodiments, the invention uses a passively mode-locked optically pumped semiconductor vertical-external-cavity surface-emitting laser (OPS-EXSEL) as disclosed in U.S. Pat. No. 6,735,234, issued May 11, 2004, to R. Paschotta et al., entitled "Passively mode-locked optically pumped semiconductor external-cavity surface-emitting laser," which is incorporated herein by reference. In some embodiments, such an OPS-EXSEL laser is mode locked by a semiconductor saturable-absorber mirror (SESAM) that forms part of an external cavity. In some embodiments, such a laser is used to provide wavelength$_{IN\text{-}1}$ In some embodiments, single-frequency and/or mode-locked versions of the above lasers are amplified in Yb-doped fiber amplifiers to generate multi-watt average output powers at about 1000 nm. In some embodiments, frequency-conversion of single-frequency fiber or OPSL lasers is efficient using external resonant optical cavities. This approach for OPSLs has been described in U.S. Pat. No. 6,680,956, issued Jan. 20, 2004, to D. C. Gerstenberger and M. S. Bowers, entitled "External frequency conversion of surface-emitting diode lasers," which is incorporated herein by reference. In some embodiments, such a laser is used to provide wavelength$_{IN\text{-}1}$ FIG. 4 is a schematic box diagram 400 of an optical layout for the cw or pulsed single-frequency approach. FIG. 4 summarizes an optical layout used in some embodiments for the cw single-frequency approach. In some embodiments, the output of a 1000-nm laser 410 is passed through lens 412. The beam is then split and passed into frequency doubler 414 and time delay 419. The 500-nm wavelength light from frequency doubler 414 is then passed through lens 416 and into a CLBO frequency doubler 418. The 250-nm wavelength light from frequency doubler 418 is then combined in a non-linear sum-frequency medium 420 with the output from time delay 419 to produce 200-nm wavelength coherent light. In some embodiments, a device such as a prism is used to separate the different output wavelengths (i.e., to separate the 1000 nm light that was input to the last stage and was not converted, the 250 nm light that was input to the last stage and was not converted, and the 200 nm light).

In some embodiments, for mode-locked versions, single passes through each of the two frequency doublers are adequate. In some embodiments, the invention separates and recombines the 1000-nm fundamental and 250-nm fourth harmonic, with appropriate time delay to synchronize the pulses in the non-linear sum-frequency medium 420, in order to properly time the pulses for fifth-harmonic generation.

Thus, an overall efficient ultraviolet laser system with output at either 200 nm, 250 nm, or both wavelengths is described using a single 1000 nm source laser. In various embodiments, the source laser is cw single-frequency or mode-locked, a fiber laser or VCSEL laser, followed by a fiber amplifier. Wall et al. summarize a mode-locked 205 nm source and provide a good summary of alternative laser sources in the 190- to 200-nm spectral range. (See K. F. Wall et al., "A quasi-continuous-wave deep ultraviolet laser source", *IEEE. J. Quantum Electron.*, 39(9), 1160, September, 2003, and which is incorporated herein by reference.)

In some embodiments, the present invention provides an apparatus that includes a source of laser light having a first wavelength; a first frequency-doubler device that receives the laser light and that outputs light having a second wavelength of one-half the first wavelength; a second frequency-doubler device that receives the light having the second wavelength and that outputs light having a third wavelength of one-half the second wavelength; a delay unit that receives the laser light and outputs a delayed laser light; and a sum-frequency mixer device that receives the delayed laser light and the light having the third frequency and that outputs light having a fourth wavelength equal to the product of the first wavelength and the third wavelength divided by the sum of the first wavelength and the third wavelength.

In some embodiments, the first wavelength is 1000 nm, the second wavelength is 500 nm, the third wavelength is 250 nm, and the fourth wavelength is 200 nm.

In some embodiments, the first wavelength is about 1000 nm, and the fourth wavelength is about 200 nm.

In some embodiments, the first wavelength is 1090 nm, and the fourth wavelength is 194 nm.

In some embodiments, the second frequency-doubler device includes a non-critical phase matching CLBO device.

In some embodiments, the sum-frequency mixer device includes a non-critical phase matching CLBO device.

In some embodiments, the sum-frequency mixer device includes a non-critical phase matching CLBO device and the first wavelength is 1000 nm, the second wavelength is 500 nm, the third wavelength is 250 nm, and the fourth wavelength is 200 nm.

In some embodiments, the sum-frequency mixer device includes a non-critical phase matching CLBO device and the first wavelength is about 1000 nm, and the fourth wavelength is about 200 nm.

In some embodiments, the sum-frequency mixer device includes a non-critical phase matching CLBO device and the source of laser light includes a pulsed ytterbium (Yb) doped fiber laser tuned to 1000 nm.

In some embodiments, the present invention provides an apparatus that includes a source of pulsed laser light having a first wavelength of 1000 nm; a first frequency-doubler device that receives the laser light and that outputs light having a second wavelength of 500 nm; a second frequency-doubler device that receives the light having the second wavelength and that outputs light having a third wavelength of 250 nm; a delay unit that receives the laser light and outputs a delayed laser light at 1000 nm; a sum-frequency mixer device that includes CLBO and that receives the delayed laser light and the light having the third frequency and that outputs light having a fourth wavelength of 200 nm.

In some embodiments, the source of laser light includes a pulsed ytterbium (Yb) doped fiber laser tuned to 1000 nm.

In some embodiments, the present invention includes a method providing laser light having a first wavelength; doubling a frequency of the laser light and outputting light having a second wavelength of one-half the first wavelength; doubling a frequency of the light having the second wavelength and outputting light having a third wavelength of one-half the second wavelength; delaying the laser light and outputting a delayed laser light; sum-frequency mixing the delayed laser light and the light having the third frequency and outputting light having a fourth wavelength equal to the product of the first wavelength and the third wavelength divided by the sum of the first wavelength and the third wavelength.

In some embodiments, the sum-frequency mixing includes non-critical phase matching using a CLBO device.

In some embodiments, the first wavelength is 1000 nm, the second wavelength is 500 nm, the third wavelength is 250 nm, and the fourth wavelength is 200 nm.

In some embodiments, the providing laser light having a first wavelength includes using a ytterbium (Yb) doped fiber laser tuned to 1000 nm.

In some embodiments, the present invention provides an apparatus that includes a source of laser light having a first wavelength; and means for quintupling a frequency of the laser light outputting light having a fourth wavelength equal to one fifth the first wavelength.

In some further embodiments, the means for quintupling the frequency of the laser light includes means for doubling a frequency of the laser light and outputting light having a second wavelength of one-half the first wavelength; means for doubling a frequency of the light having the second wavelength and outputting light having a third wavelength of one-half the second wavelength; means for delaying the laser light and outputting a delayed laser light; means for sum-frequency mixing the delayed laser light and the light having the third frequency and outputting light having a fourth wavelength equal to the product of the first wavelength and the third wavelength divided by the sum of the first wavelength and the third wavelength.

In some embodiments, the means for sum-frequency mixing includes a CLBO device.

In some embodiments, the present invention provides a method that includes providing a non-critically phase-matched (NCPM) cesium lithium borate (CLBO) device; providing laser light having a first wavelength; doubling a frequency of the laser light and outputting light having a second wavelength of one-half the first wavelength; doubling a frequency of the light having the second wavelength and outputting light having a third wavelength of one-half the second wavelength; and sum-frequency mixing, in the NCPM CLBO device, the laser light having the first wavelength and the light having the third frequency and outputting light having a fourth wavelength equal to a product of the first wavelength and the third wavelength divided by a sum of the first wavelength and the third wavelength. In some embodiments of this method, the doubling the frequency of the light having the second wavelength includes non-critical phase-matching using a CLBO device. In some embodiments of this method, the first wavelength is 1000 nm, the second wavelength is 500 nm, the third wavelength is 250 nm, and the fourth wavelength is 200 nm.

In some embodiments, the present invention provides an apparatus that includes a source of laser light having a first wavelength; a first frequency-doubler device that receives the laser light having the first wavelength and that outputs light having a second wavelength of one-half the first wavelength; a second frequency-doubler device that receives the light having the second wavelength and that outputs light having a third wavelength of one-half the second wavelength; and a non-critically phase-matched (NCPM) cesium lithium borate (CLBO) sum-frequency mixer device that receives the laser light having the first wavelength and the light having the third frequency and that outputs light having a fourth wavelength equal to a product of the first wavelength and the third wavelength divided by a sum of the first wavelength and the third wavelength. In some embodiments of this apparatus, the first wavelength is 1000 nm, the second wavelength is 500 nm, the third wavelength is 250 nm, and the fourth wavelength is 200 nm. In some embodiments of this apparatus, the first wavelength is about 1000 nm, and the fourth wavelength is about 200 nm. In some embodiments of this apparatus, the source of laser light includes a pulsed ytterbium (Yb) doped fiber laser tuned to 1000 nm. In some embodiments of this apparatus, the second frequency-doubler device includes a non-critical phase matching CLBO device. In some embodiments of this apparatus, the second frequency-doubler device includes a non-critical phase matching CLBO device and the first wavelength is 1000 nm, the second wavelength is 500 nm, the third wavelength is 250 nm, and the fourth wavelength is 200 nm. In some embodiments of this apparatus, the second frequency-doubler device includes a non-critical phase matching CLBO device and the first wavelength is about 1000 nm, and the fourth wavelength is about 200 nm. In some embodiments of this apparatus, the second frequency-doubler device includes a non-critical phase matching CLBO device and the source of laser light includes a pulsed ytterbium (Yb) doped fiber laser tuned to 1000 nm.

In some embodiments, the present invention provides an apparatus that includes a source of laser light having a first wavelength of 1000 nm; a first frequency-doubler device that receives the laser light and that outputs light having a second wavelength of 500 nm; a second frequency-doubler device that receives the light having the second wavelength and that outputs light having a third wavelength of 250 nm; and a non-critically phase-matched (NCPM) cesium lithium borate (CLBO) sum-frequency mixer device and that receives the laser light and the light having the third frequency and that outputs light having a fourth wavelength of 200 nm. In some embodiments of this apparatus, the source of laser light includes a pulsed ytterbium (Yb) doped fiber laser tuned to 1000 nm.

In some embodiments, the present invention provides an apparatus that includes a source of laser light having a first wavelength; a source of laser light having a second wavelength; a first frequency-doubler device that receives the laser light having the second wavelength and that outputs light having a third wavelength of half of the second wavelength; a second frequency-doubler device that receives the light having the third wavelength and that outputs light having a fourth wavelength of half of the third wavelength; and a non-critically phase-matched (NCPM) cesium lithium borate (CLBO) sum-frequency mixer device and that receives the laser light having the first wavelength and the light having the fourth wavelength and that outputs light having a fifth wavelength equal to a product of the first wavelength and the fourth wavelength divided by a sum of the first wavelength and the fourth wavelength. In some embodiments of this apparatus, the first wavelength is 1090 nm, the second wavelength is 944 nm, the third wavelength is 472 nm, the fourth wavelength is 236 nm, and the fifth wavelength is 194 nm. In some embodiments of this apparatus, the second frequency-doubler device includes a non-critical phase matching CLBO device.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
a source of laser light having a first wavelength;
a first frequency-doubler device that receives the laser light and that outputs light having a second wavelength of one-half the first wavelength;
a second frequency-doubler device that receives the light having the second wavelength and that outputs light having a third wavelength of one-half the second wavelength;
a delay unit that receives the laser light and outputs a delayed laser light; and
a sum-frequency mixer device that receives the delayed laser light and the light having the third frequency and that outputs light having a fourth wavelength equal to a product of the first wavelength and the third wavelength divided by a sum of the first wavelength and the third wavelength.

2. The apparatus of claim 1, wherein the first wavelength is 1000 nm, the second wavelength is 500 nm, the third wavelength is 250 nm, and the fourth wavelength is 200 nm.

3. The apparatus of claim 1, wherein the first wavelength is about 1000 nm, and the fourth wavelength is about 200 nm.

4. The apparatus of claim 1, wherein the source of laser light includes a pulsed ytterbium (Yb) doped fiber laser tuned to 1000 nm.

5. The apparatus of claim 1, wherein the sum-frequency mixer device includes a non-critical phase matching CLBO device.

6. The apparatus of claim 5, wherein the first wavelength is 1000 nm, the second wavelength is 500 nm, the third wavelength is 250 nm, and the fourth wavelength is 200 nm.

7. The apparatus of claim 5, wherein the first wavelength is about 1000 nm, and the fourth wavelength is about 200 nm.

8. The apparatus of claim 5, wherein the source of laser light includes a pulsed ytterbium (Yb) doped fiber laser tuned to 1000 nm.

9. The apparatus of claim 1, wherein the second frequency-doubler device includes a non-critical phase matching CLBO device.

10. The apparatus of claim 5, wherein the second frequency-doubler device includes a non-critical phase matching CLBO device.

11. An apparatus comprising:
a source of pulsed laser light having a first wavelength of 1000 nm;
a first frequency-doubler device that receives the laser light and that outputs light having a second wavelength of 500 nm;
a second frequency-doubler device that receives the light having the second wavelength and that outputs light having a third wavelength of 250 nm;
a delay unit that receives the laser light and outputs a delayed laser light at 1000 nm; and
a sum-frequency mixer device that includes a non-critically phase-matched (NCPM) cesium lithium borate (CLBO) device and that receives the delayed laser light and the light having the third frequency and that outputs light having a fourth wavelength of 200 nm.

12. The apparatus of claim 11, wherein the source of pulsed laser light includes a ytterbium (Yb) doped fiber laser tuned to 1000 nm.

13. A method comprising:
providing laser light having a first wavelength;
doubling a frequency of the laser light and outputting light having a second wavelength of one-half the first wavelength;

doubling a frequency of the light having the second wavelength and outputting light having a third wavelength of one-half the second wavelength;

delaying the laser light and outputting a delayed laser light; and sum-frequency mixing the delayed laser light and the light having the third frequency and outputting light having a fourth wavelength equal to a product of the first wavelength and the third wavelength divided by a sum of the first wavelength and the third wavelength.

14. The method of claim 13, wherein the doubling the frequency of the light having the second wavelength includes non-critical phase matching using a CLBO device.

15. The method of claim 14, wherein the first wavelength is 1000 nm, the second wavelength is 500 nm, the third wavelength is 250 nm, and the fourth wavelength is 200 nm.

16. The method of claim 14, wherein the providing laser light having a first wavelength includes using a ytterbium (Yb) doped fiber laser tuned to 1000 nm.

17. An apparatus comprising:
a source of laser light having a first wavelength; and
means for quintupling a frequency of the laser light including:
means for generating laser light having a second wavelength,
means for generating laser light having a third wavelength, and
non-critically phase-matched means for sum-frequency mixing the laser light having the first wavelength and the laser light having the third wavelength and outputting light having a fourth wavelength equal to one fifth the first wavelength.

18. An apparatus comprising:
a source of laser light having a first wavelength; and
means for quintupling a frequency of the laser light outputting light having a fourth wavelength equal to one fifth the first wavelength, wherein the means for quintupling the frequency of the laser light further includes:
means for doubling a frequency of the laser light and outputting light having a second wavelength of one-half the first wavelength;
means for doubling a frequency of the light having the second wavelength and outputting light having a third wavelength of one-half the second wavelength;
means for delaying the laser light and outputting a delayed laser light; and
means for sum-frequency mixing the delayed laser light and the light having the third frequency and outputting light having a fourth wavelength equal to a product of the first wavelength and the third wavelength divided by a sum of the first wavelength and the third wavelength.

19. The apparatus of claim 18, wherein the means for sum-frequency mixing includes a CLBO device.

20. A method comprising:
providing a non-critically phase-matched (NCPM) cesium lithium borate (CLBO) device;
providing laser light having a first wavelength;
doubling a frequency of the laser light and outputting light having a second wavelength of one-half the first wavelength;
doubling a frequency of the light having the second wavelength and outputting light having a third wavelength of one-half the second wavelength; and
sum-frequency mixing, in the NCPM CLBO device, the laser light having the first wavelength and the light having the third frequency and outputting light having a fourth wavelength equal to a product of the first wavelength and the third wavelength divided by a sum of the first wavelength and the third wavelength.

21. The method of claim 20, wherein the doubling the frequency of the light having the second wavelength includes non-critical phase matching using a CLBO device.

22. A method comprising:
providing a first and a second non-critically phase-matched (NCPM) cesium lithium borate (CLBO) device;
providing laser light having a first wavelength;
doubling a frequency of the laser light and outputting light having a second wavelength of one-half the first wavelength;
doubling a frequency of the light having the second wavelength and outputting light having a third wavelength of one-half the second wavelength; and
sum-frequency mixing, in the second NCPM CLBO device, the laser light having the first wavelength and the light having the third frequency and outputting light having a fourth wavelength equal to a product of the first wavelength and the third wavelength divided by a sum of the first wavelength and the third wavelength, wherein the doubling the frequency of the light having the second wavelength includes non-critical phase matching using a CLBO device; and
wherein the first wavelength is 1000 nm, the second wavelength is 500 nm, the third wavelength is 250 nm, and the fourth wavelength is 200 nm.

23. An apparatus comprising:
a source of laser light having a first wavelength;
a first frequency-doubler device that receives the laser light having the first wavelength and that outputs light having a second wavelength of one-half the first wavelength;
a second frequency-doubler device that receives the light having the second wavelength and that outputs light having a third wavelength of one-half the second wavelength; and
a non-critically phase-matched (NCPM) cesium lithium borate (CLBO) sum-frequency mixer device that receives the laser light having the first wavelength and the light having the third frequency and that outputs light having a fourth wavelength equal to a product of the first wavelength and the third wavelength divided by a sum of the first wavelength and the third wavelength.

24. The apparatus of claim 23, wherein the first wavelength is about 1000 nm, and the fourth wavelength is about 200 nm.

25. The apparatus of claim 23, wherein the source of laser light includes a pulsed ytterbium (Yb) doped fiber laser tuned to 1000 nm.

26. The apparatus of claim 23, wherein the second frequency-doubler device includes a non-critical phase matching CLBO device.

27. The apparatus of claim 26, wherein the first wavelength is about 1000 nm, and the fourth wavelength is about 200 nm.

28. The apparatus of claim 26, wherein the source of laser light includes a pulsed ytterbium (Yb) doped fiber laser tuned to 1000 nm.

29. An apparatus comprising:
a source of laser light having a first wavelength;
a first frequency-doubler device that receives the laser light having the first wavelength and that outputs light having a second wavelength of one-half the first wavelength;
a second frequency-doubler device that receives the light having the second wavelength and that outputs light having a third wavelength of one-half the second wavelength; and
a non-critically phase-matched (NCPM) cesium lithium borate (CLBO) sum-frequency mixer device that receives the laser light having the first wavelength and the light having the third frequency and that outputs light having a fourth wavelength equal to a product of the first wavelength and the third wavelength divided by a sum of the first wavelength and the third wavelength; and wherein the first wavelength is 1000 nm, the second wavelength is 500 nm, the third wavelength is 250 nm, and the fourth wavelength is 200 nm.

30. An apparatus comprising:

a source of laser light having a first wavelength;

a first frequency-doubler device that receives the laser light having the first wavelength and that outputs light having a second wavelength of one-half the first wavelength;

a second frequency-doubler device that receives the light having the second wavelength and that outputs light having a third wavelength of one-half the second wavelength;

a non-critically phase-matched (NCPM) cesium lithium borate (CLBO) sum-frequency mixer device that receives the laser light having the first wavelength and the light having the third frequency and that outputs light having a fourth wavelength equal to a product of the first wavelength and the third wavelength divided by a sum of the first wavelength and the third wavelength;

wherein the second frequency-doubler device includes a non-critical phase matching CLBO device; and wherein the first wavelength is 1000 nm, the second wavelength is 500 nm, the third wavelength is 250 nm, and the fourth wavelength is 200 nm.

31. An apparatus comprising:

a source of laser light having a first wavelength of 1000 nm;

a first frequency-doubler device that receives the laser light and that outputs light having a second wavelength of 500 nm;

a second frequency-doubler device that receives the light having the second wavelength and that outputs light having a third wavelength of 250 nm; and a non-critically phase-matched (NCPM) cesium lithium borate (CLBO) sum-frequency mixer device and that receives the laser light and the light having the third frequency and that outputs light having a fourth wavelength of 200 nm.

32. The apparatus of claim 31, wherein the source of laser light includes a pulsed ytterbium (Yb) doped fiber laser tuned to 1000 nm.

* * * * *